United States Patent

Eberle

[11] Patent Number: 5,306,212
[45] Date of Patent: Apr. 26, 1994

[54] CHAIN-TURNING SYSTEM

[75] Inventor: Jürg Eberle, Hinwil, Switzerland

[73] Assignee: Ferag AG, Hinwil, Switzerland

[21] Appl. No.: 2,182

[22] Filed: Jan. 8, 1993

[30] Foreign Application Priority Data

Feb. 5, 1992 [CH] Switzerland .................. 00327/92

[51] Int. Cl.$^5$ ............................................. F16H 55/00
[52] U.S. Cl. ................................................... 474/140
[58] Field of Search ........................ 474/140, 144–148

[56] References Cited

U.S. PATENT DOCUMENTS

| | | | |
|---|---|---|---|
| 2,489,772 | 11/1949 | Hall | 474/140 |
| 4,492,304 | 1/1985 | Geis | 474/140 X |
| 4,498,890 | 2/1985 | Sutherland | |

FOREIGN PATENT DOCUMENTS

| | | |
|---|---|---|
| 662898 | 10/1965 | Belgium . |
| 688182 | 2/1940 | Fed. Rep. of Germany . |
| 2730998 | 1/1978 | Fed. Rep. of Germany . |
| 623283 | 5/1981 | Switzerland . |
| 1098033 | 1/1968 | United Kingdom . |

OTHER PUBLICATIONS

Dubbels Taschenbuch fur den Maschinenbau p. 750, Springer-Verlag, 1961.

Primary Examiner—Thuy M. Bui
Attorney, Agent, or Firm—McCormick, Paulding, Huber

[57] ABSTRACT

To reduce the polygonal effect, the chain-turning system described in the present disclosure has at least one transition curve (UK11, UK12) that joins up with the circular turning arc (B.11) and the radius of curvature of the transition curve varies continually. This transition curve may join up with a straight portion of the chain's track (G.11, G.12) or with another turning arc. The transition curve may, for example, be a portion of a clothoid, whose radius of curvature at its junction (A.11, A.12) with the turning arc (B.11) is the same as the turning radius and at its junction (C.11, C.12) with the straight portion of the chain's track (G.11, G.12) is infinitely large.

11 Claims, 4 Drawing Sheets

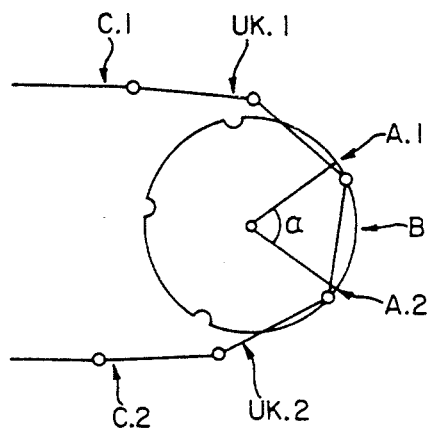
FIG. 2a
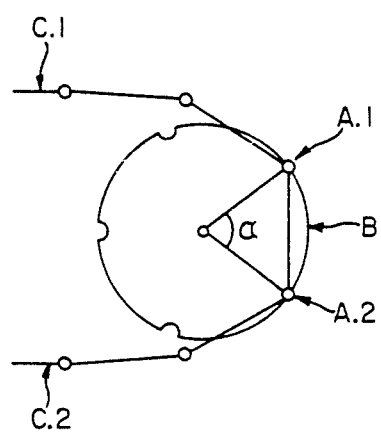
FIG. 2b
| Z | Δ % |
|---|---|
| 7.5 | ~? 2.6 |
FIG. 2c
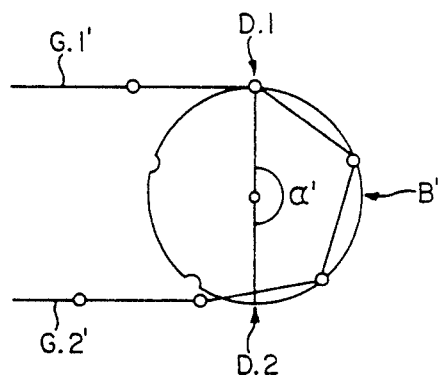
FIG. 2d
PRIOR ART
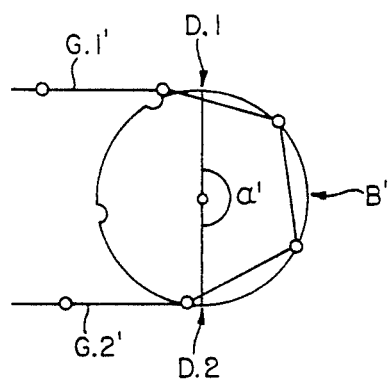
FIG. 2e
PRIOR ART
| Z | Δ % |
|---|---|
| 17 | ~1 |
| 13 | ~1.7 |
| 12 | ~2 |
| 11 | ~2.7 |
| 9 | ~3.6 |
| 7.5 | ~5 |
FIG. 2f
PRIOR ART
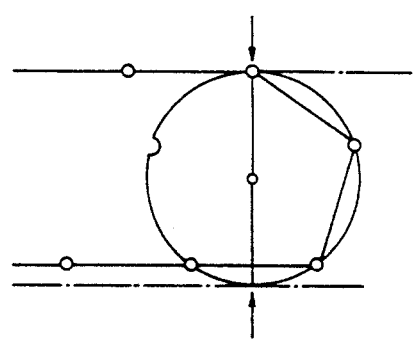
FIG. 2g
PRIOR ART
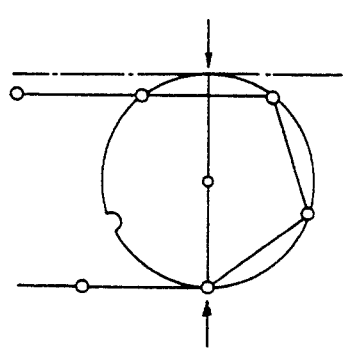
FIG. 2h
PRIOR ART
| Z | Δ % |
|---|---|
| 19 | 1.36 |
| 17 | 1.70 |
| 13 | 2.90 |
| 12 | 3.41 |
| 11 | 4.05 |
| 9 | 6.03 |
| 7.5 | 8.65 |
FIG. 2i
PRIOR ART

CHAIN-TURNING SYSTEM

BACKGROUND OF THE INVENTION

The present invention relates to chains, in particular to conveyor chains, and refers to a chain-turning system in accordance with the generic term of the independent patent claim.

PRIOR ART

Chains used as conveyor or drive systems that move along a closed track must be turned. This is done by turning systems such as sprocket wheels and/or chain guides. Usually such a turning system is a portion of the chain's track that lies in a single plane and forms a circular arc (hereinafter referred to as the turning arc) whose radius (turning radius) and aperture angle (turning angle) determine the turn, and generally joins up with straight portions of the chain's track. The chain moves around such a turning system like a rotating polygon, hence its motion is uneven. In other words, when for example a chain-driving sprocket wheel rotating at a constant angular speed acts as a chain-turning system, it cannot maintain an exactly constant chain speed; conversely, a sprocket wheel driven by a chain moving at constant speed cannot maintain an exactly constant angular speed. The unevenness of the motion depends on the number of teeth of the sprocket wheel, i.e. the motion becomes more uneven as the number of teeth decreases. Particularly in complex systems with a large number of different turning systems, this also has the result that unwanted forces and undesirable oscillations and vibrations occur, act on the chains and/or turning elements, and thus increase wear and tear in the systems. According to accepted doctrine (Dubbels Taschenbuch für Maschinenbau [Dubbel's Mechanical Engineering Pocket Manual], 12th edition, volume 1, page 750), this so-called polygonal effect in a chain-turning system can be limited by sprocket wheels with at least seventeen teeth. Because chains have links of a given length, this therefore determines the turning radius or, in the case of a chain drive with two sprocket wheels, it can be avoided by the use of two sprocket wheels that both have the same even number of teeth. Either of these means sets considerable limits to the three-dimensional design of chain systems. This applies particularly to conveyor chains, whose links should be as long as possible to reduce to a minimum the forces that act on them in the direction of movement because of the objects they transport; in these, the need for at least seventeen teeth is an extremely irksome restriction. For example, chains with 100 mm long links are perfectly normal in conveyor systems for printed products; thus the turning radius cannot be less than about 270 mm in this type of chain.

The polygonal effect in guided chain-turning systems, such as those described in the present applicant's German patent specification 2730998 and Swiss patent specification 623283, is demonstrably smaller than in those without chain guides and turned by sprocket wheels, but it is still too great even in that type of system where small turning radii are desired.

SUMMARY OF THE INVENTION

The object of the present invention is therefore to propose a chain-turning system that by comparison with prior art lowers the lower limit of the turning radius due to the polygonal effect for a given length of chain link, i.e. to provide a chain-turning system in which the polygonal effect is less than in chain-turning systems made in accordance with prior art, so that, for the same polygonal effect, a chain with links of a given length can be turned at a significantly smaller turning radius.

The chain-turning system with the features described in the independent patent claim hereof meets these requirements.

The central idea in the chain-turning system described in the present disclosure is to reduce the polygonal effect by making the track of the chain join up with one or both sides of the turning arc (a circular arc), not by an intrinsically straight tangential line thereto in accordance with prior art, but by a transition curve curved in approximately the same plane as the turning arc. The junction between the two portions of the track, i.e. turning arc and transition curve, should be formed by an intrinsically common tangent. Hence the curvature of the transition curve that joins up with the turning arc should not be constant, but should be such that the difference between its radius of curvature and the turning radius (i.e. the radius of the circular turning arc) becomes continually smaller as it approaches the junction with the turning arc. The sense of curvature should preferably be the same for the turning arc and the transition curve.

Straight portions of track or further turning systems can then, for example, join up with the transition curve. It is thus a further feature of the turning system described in the present disclosure that these straight portions of the chain's track need not align tangentially with the turning arc as in turning systems made in accordance with prior art.

The chain's track in the chain-turning system described in the present disclosure is defined by guidance devices. On the one hand, these may be turning systems that guide the chain around the turning arc, such as a sprocket wheel and/or a chain channel that forms a circular arc; on the other, they may, for example, be mechanical chain guides along the transition curve which, according to the kind of forces that act on the chain (tension, impact, and other forces, for example produced by transported objects) may be guide rails shaped as more or less closed guide channels which may also be continuous along adjacent straight portions of the chain's track.

The drawings attached hereto explain the polygonal effect and how the chain-turning system described in the present disclosure reduces said effect; and they also show typical embodiments, partly diagrammatically and partly in detail, of the chain-turning system described in the present disclosure, as follows:

BRIEF DESCRIPTION OF DRAWINGS

FIGS. 2a-2i show the polygonal effect in three chain-turning systems, i.e. in a typical embodiment of the chain-turning system described in the present disclosure; and in a turning system made in accordance with prior art, with and without guides respectively;

DESCRIPTION OF THE PREFERRED EMBODIMENTS

Figure 1:
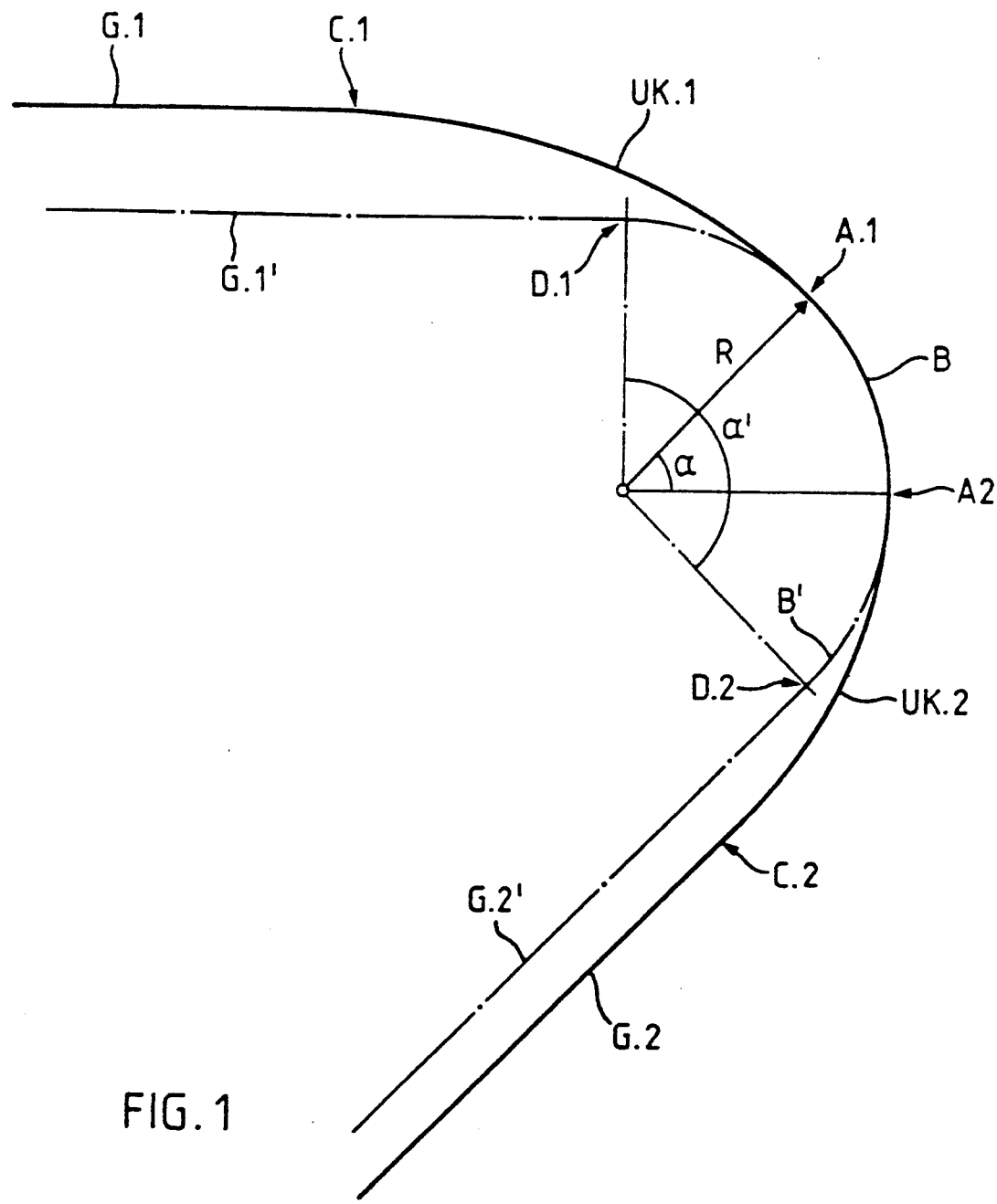
FIG. 1 is a diagrammatic representation of the principle applied in the chain-turning system described in the present disclosure.

FIG. 1 is a diagrammatic representation of a typical embodiment of the principle of the chain-turning system described in the present disclosure, which consists of two essentially straight portions of a chain's track G.1 and G.2 in different directions, and a turning system between them that has a turning arc B of radius R and an aperture angle $\alpha$. The circle with radius R represents the pitch circle of a sprocket wheel or a corresponding line in a turning channel. In accordance with the present disclosure, the turning system about arc B joins up with the transition curves UK.1 and UK.2 at junction points A.1 and A.2 respectively, for example on both sides as shown, and these then join up with the straight portions of the track G.1 and G.2 at junction points C.1 and C.2 respectively.

In this figure, a dash-dotted line also shows a typical chain-turning system in accordance with prior art, wherein the straight portions of track G.1' and G.2' join up without a transition curve with the turning arc B' at junctions D.1' and D.2' respectively, hence essentially the same turning system has an aperture angle $\alpha'$ of the turning arc B' that is greater than the corresponding aperture angle $\alpha$ of arc B.

For the transition curve UK and its radius of curvature RUK (not shown in the drawing) of the embodiment shown in FIG. 1, wherein the sense of curvature of the transition curve is the same as that of the turning arc and the transition curve joins up with a straight section of track, the following conditions apply:

1: at junctions A.1 and A.2, RUK(A) is equal to or greater than R and the turning arc and the transition curve have a common tangent;
2: at any other point of the transition curve, RUK is greater than RUK(A);
3: at junction points C.1 and C.2, RUK(C) can be equal to infinity; and
4: the length of the radius of curvature between junctions A.1 and C.1 on the one hand and between A.2 and C.2 on the other varies continually and in the same sense.

It can be shown that in the turning system of a chain whose links are of a given length, the polygonal effect about a given turning radius becomes less as the gradient of the radius of curvature becomes smaller and as the difference decreases between the radius of curvature of the transition curve and the turning radius of the turning arc at the junction. It can likewise be shown that in a turning system with transition curves on both sides, the polygonal effect is less than in a turning system with a transition curve on one side only.

The transition curve can, for example, be a portion of a clothoid. The clothoid is a curve that forms a spiral and conforms to the general expression $K=(L \times R)^{\frac{1}{2}}$, wherein K is a constant parameter for a given clothoid, L is the length of the curve from the clothoid's starting point where $L=0$ and $R=\infty$, R is the radius of curvature, and the clothoid extends from the junction point at which $R=\infty$ and $L=0$ to that where $R=0$ and $L=\infty$.

The portion of the clothoid that forms the transition curve extends from $R=RUK(A)$ to RUK(C).

FIGS. 2a-2i show three typical chain-turning systems to explain the polygonal effect. In these chain-turning systems, the chain is turned through 180° and the sprocket wheel may be a drive wheel, a driven wheel, or a passively turning wheel. The sprocket wheel shown in these examples has five teeth, so that in a turning system made in accordance with prior art the turning radius is very small in relation to the length of the chain links and thus the polygonal effect is large.

FIGS. 2a and 2b show next to each other two different stages in the rotation of the chain-turning system described in the present disclosure. Its parts correspond essentially to those shown in FIG. 1 and thus bear the same reference marks. To ensure that the chain always meshes with at least one tooth of the sprocket wheel, the aperture angle $\alpha$ must always be equal to or greater than $360 \div n_t$, where $n_t$ is the number of the sprocket wheel's teeth that mesh with the chain in a single rotation of the wheel. This condition does not apply to turning systems in a chain channel or other means of guidance without teeth. Measurements show that when a sprocket wheel with fifteen teeth, every second of which meshes with the chain (i.e. whose effective number of teeth $n_t=7.5$), turns at a constant angular speed, the unevenness $\Delta$ of motion (cf table of FIG. 2c, in which $Z=n_t$), for example the difference between the maximum and minimum chain speeds in relation to the sprocket wheel's peripheral velocity, is about 2.6%. To demonstrate more clearly the advantages obtainable with the turning system described in the present disclosure, the table also gives the corresponding values for turning system made in accordance with prior art.

FIGS. 2d and e show a turning system in accordance with prior art. The sprocket wheel is identical to that shown above. Suitable guidance device guide the chain in a straight line tangentially to the junctions D.1 and D.2 with the sprocket wheel's pitch circle. The computed values for the unevenness $\Delta$ that occurs in such a turning system are again given in the table in FIG. 2f, in this case for various numbers of teeth. These figures are obviously significantly higher than for the corresponding turning system described in the present disclosure.

FIGS. 2g and h show a chain-turning system without a chain guide in the straight portions of the chain's track. In such a turning system, the position of the straight portions of the chain's track is not constant but varies between two extreme positions in accordance with the sprocket wheel's position, as indicated in the two figures. The unevenness of motion that occurs is clearly visible by a comparison of two Figures. The speed of the chain shown in FIG. 2g is the same as the peripheral speed of the sprocket wheel's pitch circle, but in FIG. 2h it is only equal to the horizontal component thereof. At a constant speed of rotation of the sprocket wheel, the difference between these two extremes in the chain's velocity diminishes as the number of teeth increases. This is likewise shown by the computed values of $\Delta$ for various numbers of teeth, as given in the table of FIG. 2i.

Figure 3:
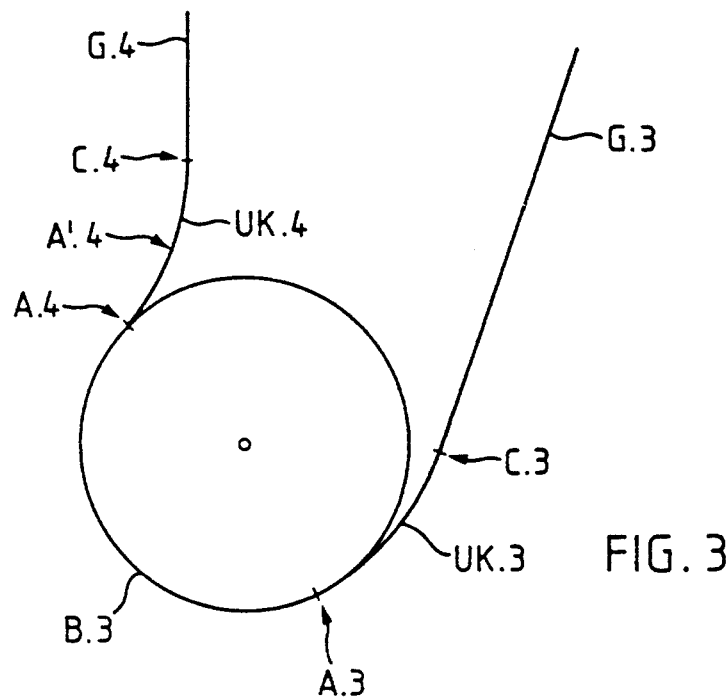
FIGS. 3 and 4 are further diagrammatic representations of typical embodiments of the turning system described in the present disclosure.

FIG. 3 shows in the same diagrammatic manner as FIG. 1 a further typical embodiment of the turning system described in the present disclosure. As in FIG. 1, this is likewise a turning system between two straight portions G.3 and G.4 of the chain's track. The turning system's part in the chain's track likewise has a circular turning arc B.3 and transition curves UK.3 and UK.4 that join up therewith, which in turn join up with the straight portions of the track G.3 and G.4 respectively. The sense of curvature of the transition curve UK.3 corresponds to that of the turning arc B.3, but is contrary to that of the transition curve UK.4. The conditions for the transition curve and its radius of curvature in connection with FIG. 1 also apply to the transition curve UK.3. For the transition curve UK.4 whose sense of curvature is contrary to that of the turning arc and in which a straight portion of track joins up with the transition curve, they are as follows:

1: the junction of the turning arc B.3 with the transition curve UK.4 is not a point but a straight line A.4-A'.4 that joins up tangentially with the turning arc B.3 and whose length is at least that of one of the chain's links;
2: at junction point A'.4, RUK(A) is smaller or greater than R or equal thereto;
3: at all other points, RUK is greater than RUK(A');
4: at junction point C.4, RUK(C) can be equal to infinity; and
5: the length of the radius of curvature between junctions A.4 and C.4 varies continually and in the same sense.

This figure shows clearly that the condition on which prior art is based, i.e. that the straight portions of the track must lie on tangents of the turning circle, does not apply to the chain-turning system described in the present disclosure.

Figure 4:
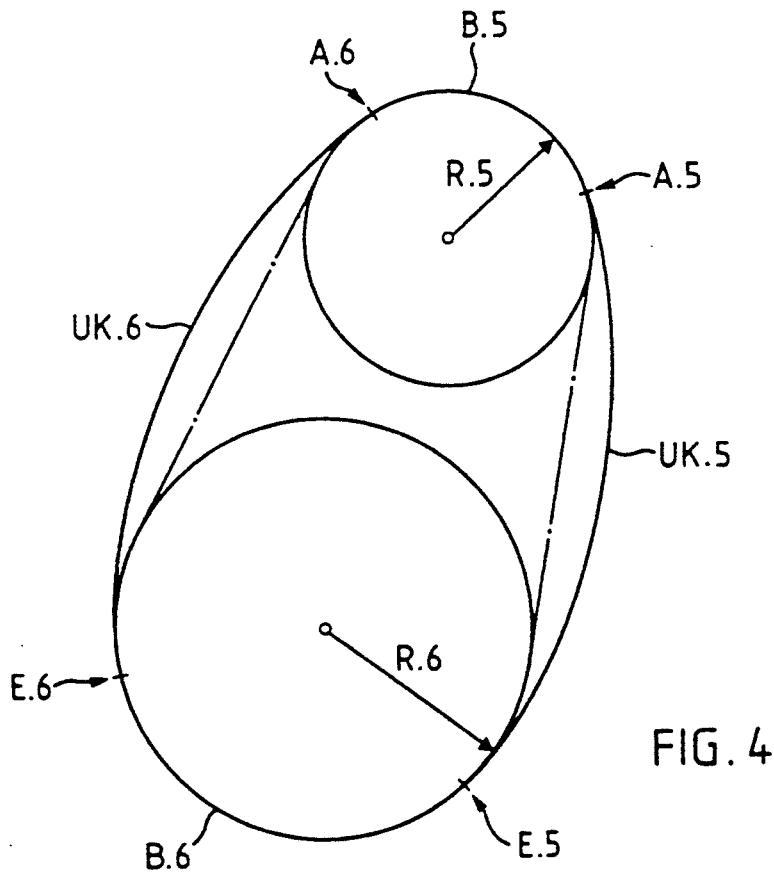

FIG. 4 is a further diagrammatic representation of a typical embodiment of the chain-turning system described in the present disclosure. It shows a double turning system, for example in a chain drive with two turning arcs B.5 and B.6 of a smaller turning radius R.5 and a larger turning radius R.6 respectively. As described in connection with FIG. 1, two transition curves UK.5 and UK.6 join up on both sides with the turning arc B.5 at junction points A.5 and A.6 respectively, and on both sides with the turning arc B.6 at junction points E.5 and E.6 respectively. For the transition curves UK.5 and UK.6 which join up with both sides of both the turning arcs, the following conditions apply:

1: at junction points A.5 and A.6 with turning arc B.5 of the smaller turning radius R.5, the radius of curvature RUK(A) is equal to or greater than R.5;
2: at junction points E.5 and E.6 with turning arc B.6 of the greater turning radius R.6, the radius of curvature RUK(E) is greater than R.6;
3: the length of the radius of curvature increases continually from the junction points A.5 and A.6 to junction points E.5 and E.6 respectively.

A dash-dotted line in FIG. 4 again shows the corresponding track of a chain made in accordance with prior art.

An infinite number of combinations and permutations of turning arcs, transition curves, and straight portions of chain track is possible in accordance with FIGS. 3 and 4.

Figure 5:
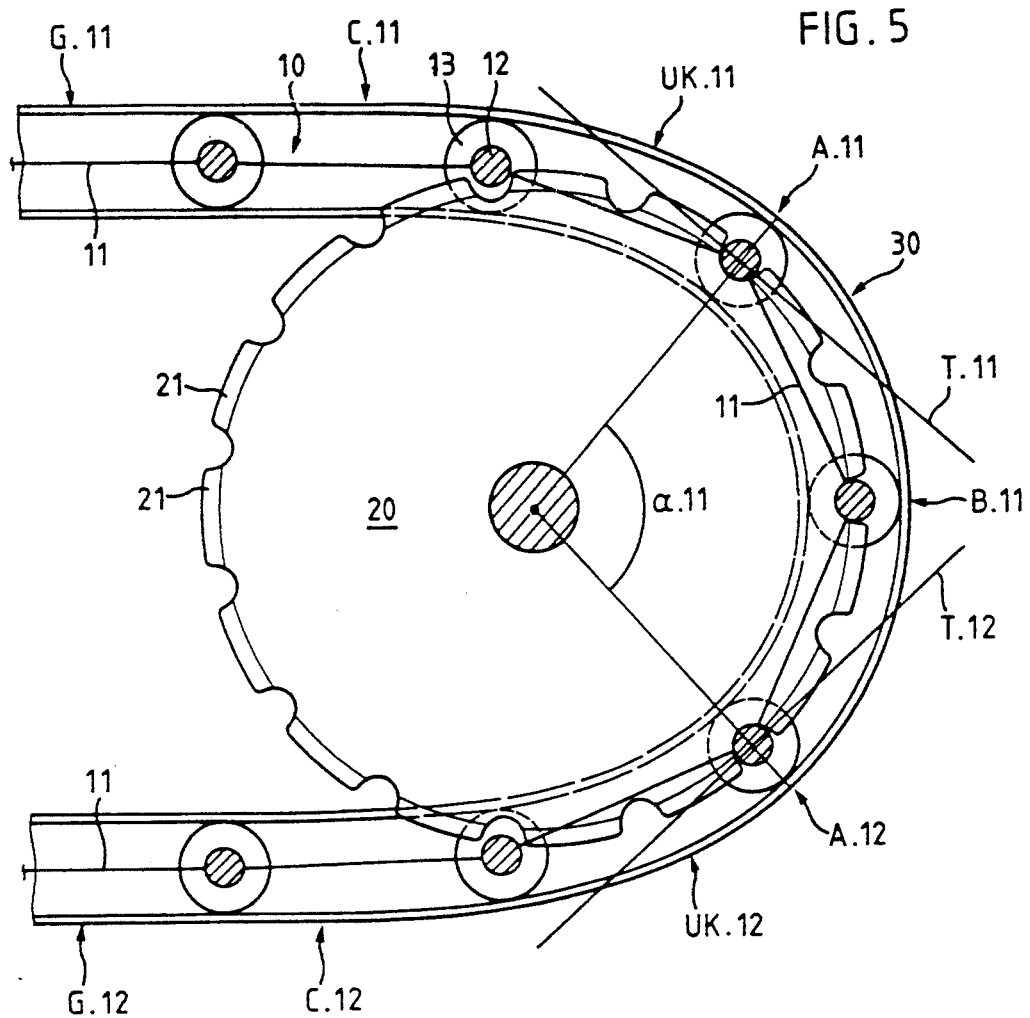
FIG. 5 is a section perpendicular to the chain's centreline of a typical embodiment of the chain-turning system described in the present disclosure, as applicable to a conveyor chain on rollers.
Figure 6:
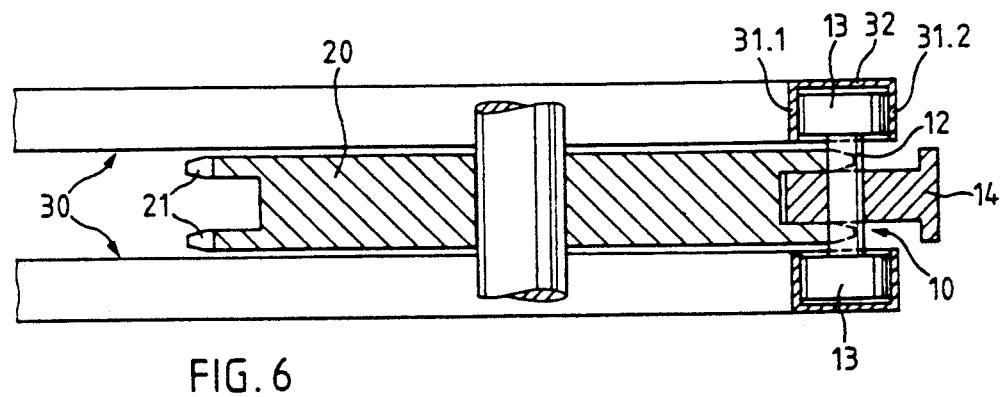
FIG. 6 is a section parallel to the chain's centreline of the turning system in accordance with FIG. 5.

FIGS. 5 and 6 are detailed sections that show a further typical embodiment of the chain-turning system described in the present disclosure. In FIG. 5, the section line lies in the turning system's plane of curvature and is perpendicular to the sprocket wheel's axis; in FIG. 6, it is parallel with said axis and passes through the centre of the turning circle. These drawings show a turning system for a conveyor chain 10 around a sprocket wheel 20, wherein the chain 10 runs inside a chain channel 30 along its entire track, including the turning arc B. This channel system has the advantage that the chain can be moved in either running direction while subjected to tension and compression.

The chain 10 is of a known type as used for the transport of printed products. It consists of chain links 11, shown diagrammatically by straight lines, and articulated joints, each of which consists of a pivot and rollers 13 that rotate thereon. Clamps 14 or some other suitable means are fixed to the pivots and grip the printed products during transport. Each pivot 12 has at least one free area that can mesh with the sprocket wheel 20, for example between roller 13 and clamp 14. Effectively, the sprocket wheel shown has fifteen teeth 21; their spacing along the sprocket wheel's circumference is such that only every second tooth can mesh with the chain. Hence this is a sprocket wheel with $n_t = 7.5$ teeth to which reference is made above in connection with FIG. 2. The guide channel 30 has an inner running rail 31.1 and an outer running rail 31.2 on which the rollers 13 run, according to the forces that act on the chain, and may also have a cover plate 32 on its external face. The outer running rail 31.2 has a slot-shaped gap that extends for the full length of the channel 30, through which the clamps 14 are connected to the pivots 12 at the articulated joints. The inner running rail 31.1 likewise has a slot-shaped gap, at least adjacent to the sprocket wheel 20, through which the sprocket wheel 20 meshes with the chain 10.

In the embodiment shown in FIGS. 5 and 6, the chain's track has straight portions G.11 and G.12, transition curves UK.11 and UK.12, and a turning arc B.11. The transition curves are designed as clothoids, whose radius of curvature at junction points C.11 and C.12, where they join up with the straight portions of the track G.11 and G.12 respectively, is infinitely large; at junction points A.11 and A.12, where they join up with the turning arc B.11, it is the same as that of the pitch circle of the sprocket wheel 20. At junction points A.11 and A.12, the transition curves and the turning arc have a common tangent, T.11 and T.12 respectively. The aperture angle $\alpha.11$ of the turning arc shown in the figure is 96°, i.e. two teeth of the sprocket wheel 20 always mesh with the chain 10. For the case shown in this figure, where $n_t = 7.5$, the aperture angle of the turning arc must be at least 48°, to ensure that at least one tooth always meshes with the chain. The aperture angle should always be as small as possible, because this increases the length of the transition curves and reduces the gradient of the radius of curvature; as described above, this reduces the polygonal effect.

The above description refers only to chain-turning systems that lie in a single plane, but transition curves may readily be three-dimensional in shape. In such cases, what has been stated above also applies to the projection of the transition curve into the plane of the turning arc.

I claim:

1. Chain-turning system for a chain made of a continuous series of links articulated to each other, comprising a turning device that defines the track along which the chain moves around a circular turning arc with the turning radius (R), and chain-guidance devices so made as to provide at least one transition curve which joins up with the turning arc at a first junction point; the turning arc and the transition curve having a common tangent at the first junction point; and the curvature of the transition curve varying along its length so as to ensure that the difference between its radius of curvature and the turning radius (R) decreases continually with its distance from the first junction point.

2. Chain-turning system in accordance with claim 1, wherein the turning arc and the transition curve lie in the same plane.

3. Chain-turning system in accordance with claim 1, wherein the sense of curvature of the turning arc and of the transition curves is the same.

4. Chain-turning system in accordance with claim 1, wherein the sense of curvature of the turning arc is contrary to that of another transition curve and the junction with the other transition curve is a straight portion of the chain's track whose length is at least equal to that of one of the chain's links.

5. Chain-turning system in accordance with claim 1, wherein the radius of curvature of the transition curve at the first junction point is the same as that of the turning arc.

6. Chain-turning system in accordance with claim 1, wherein the transition curve at a second junction point joins up with a straight portion of the chain's track and the radius of curvature of the transition curve continually increases from the first junction point to the second junction point.

7. Chain-turning system in accordance with claim 6, wherein radius of curvature of the transition curve at the second junction point is infinitely large.

8. Chain-turning system in accordance with claim 1, wherein a further turning arc joins up with the transition curve at a further junction point, the turning radius of the further turning arc is greater than the turning radius of the turning arc that joins up at the first junction point and the radius of curvature at the further junction point is greater than the turning radius of the further turning arc.

9. Chain-turning system in accordance with claim 1, wherein the transition curve is a portion of a clothoid.

10. Chain-turning system in accordance with claim 1, wherein the chain-guidance devices are guide channels or guide rails.

11. Chain-turning system in accordance with claim 1, wherein the turning device is a sprocket wheel or a portion of a guidance channel curved to form a circular arc.

* * * * *